Aug. 30, 1949.  R. M. BUFFINGTON  2,480,544
AIR CONDITIONING

Filed Jan. 23, 1947  2 Sheets-Sheet 1

INVENTOR
Ralph M. Buffington
BY
ATTORNEY

Aug. 30, 1949. R. M. BUFFINGTON 2,480,544
AIR CONDITIONING
Filed Jan. 23, 1947 2 Sheets-Sheet 2
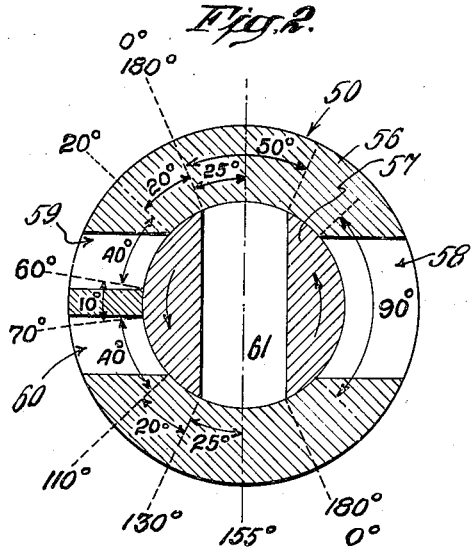
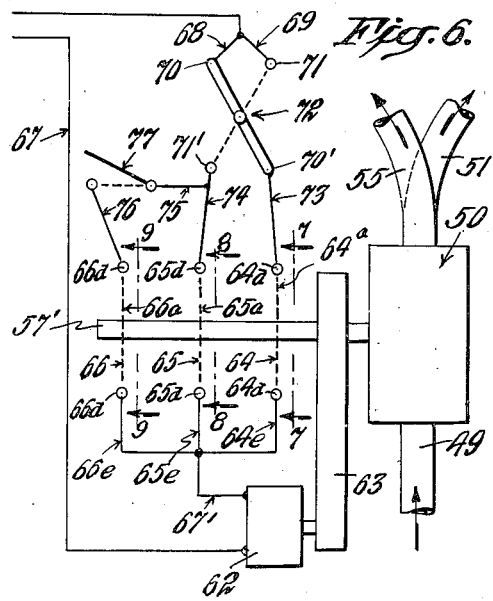
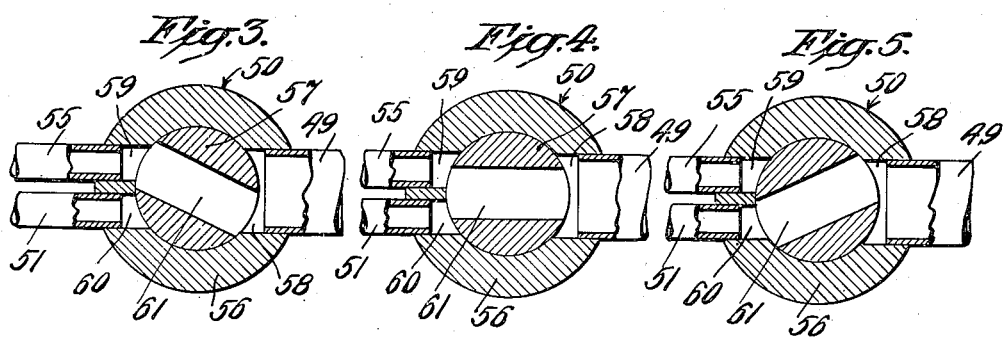
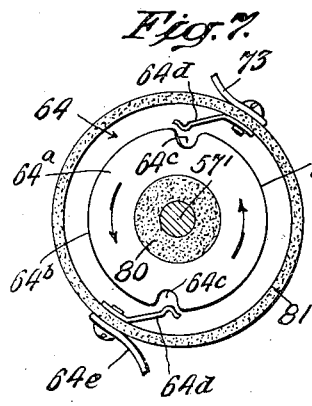
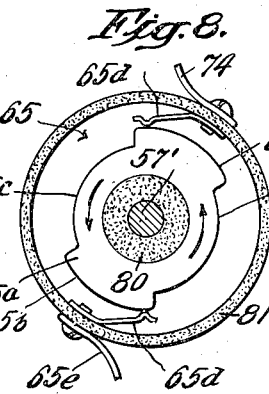
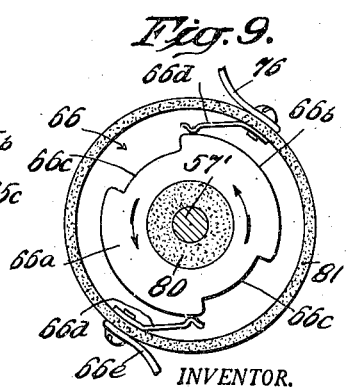
INVENTOR.
Ralph M. Buffington
BY
ATTORNEY Patented Aug. 30, 1949

2,480,544

UNITED STATES PATENT OFFICE 2,480,544

AIR CONDITIONING

Ralph M. Buffington, Evansville, Ind., assignor to Servel, Inc., New York, N. Y., a corporation of Delaware Application January 23, 1947, Serial No. 723,734

18 Claims. (Cl. 257—3)

1

This invention relates to heating and cooling and particularly to heating and cooling air by the aid of a two-pressure absorption refrigerating apparatus wherein the evaporator, which may be termed a heat exchanger, serves as both a heater and a cooler.

With absorption refrigerating apparatus of the two-pressure type it is common practice to provide pressure balancing liquid traps or columns between the high and low pressure sides of the apparatus. The trap between the condenser and evaporator of such apparatus is filled with liquid refrigerant from the condenser, and the traps between the generator and the absorber are filled with absorption solution from the generator and from the absorber. When such apparatus is used only for cooling, the trap between the condenser and evaporator is designed to have high resistance to vapor flow, the high resistance being secured, for instance, by constructing the trap of small-diameter tubing. When the apparatus is used for heating, however, it is essential that a low resistance path be provided for flow of vapor between the generator and the evaporator. Therefore, it is seen that a trap which alone offers sufficient resistance to vapor flow to cause condensation of vapor in the condenser during cooling cycles, is entirely inadequate as a vapor path during heating cycles.

In accordance with my invention, I overcome the above conflicting requirements of heating and cooling by providing a trap of such construction between the condenser and evaporator, and by controlling the flow of cooling water to the absorber and condenser in such a manner, that during cooling cycles of operation refrigerant vapor is condensed in the condenser and vaporized in the evaporator to produce cooling, and during heating cycles of operation the trap is blown free of liquid refrigerant and vapor flows substantially unrestricted from the condenser to the evaporator wherein the vapor is condensed to produce heating. Furthermore, in accordance with my invention, when the apparatus is shifted from a heating cycle to a cooling cycle, or when the apparatus is started up on a cooling cycle following a shut-down on a heating cycle, the trap between the condenser and evaporator is rapidly filled with liquid refrigerant. This is accomplished by by-passing the cooling water, which normally flows first to the absorber and then to the condenser in series, around the absorber and flowing the cooling water directly to the condenser. With this arrangement, the refrigerant vapor that is expelled from solution in the generator of such apparatus is rapidly condensed in the condenser and flows into the trap. After the trap has been filled with liquid, the cooling water control is shifted so that the cooling water flows through its normal

2 path, first to the absorber and then to the condenser. With my improved control of the cooling water, the trap between the condenser and the evaporator is not only rapidly filled with liquid at the beginning of a cooling cycle following a shutdown on a heating cycle, the trap is always rapidly filled with liquid at the beginning of each cooling cycle. That is, if, for any reason, the trap had been depleted of liquid during a shutdown or during an off period between cooling cycles, it is rapidly filled at the beginning of each cooling cycle.

When an absorption refrigerating apparatus of the type described is used as a heating unit, it is advantageous that the refrigerant-absorbent solution contain a relatively large amount of refrigerant, in this instance water, so that the generator of such apparatus may operate at lower temperatures during heating than that at which it operates during cooling. In accordance with my invention means are provided for storing liquid refrigerant in an inactive part of the system during cooling cycles of operation and for returning this stored refrigerant to an active part of the system at the beginning of each heating cycle of operation.

It is therefore an object of this invention to provide an improved heating and cooling system wherein, when heating is desired, hot refrigerant vapor flows substantially unrestricted to a heat exchanger to produce heating, and, when cooling is desired, liquid refrigerant flows to the same heat exchanger to produce cooling.

It is another object of this invention to provide means for rapidly filling the liquid trap between the condenser and the evaporator of a two-pressure absorption refrigeration apparatus at the beginning of each cooling cycle of operation.

It is a further, and equally important, object of this invention to provide for diluting the refrigerant-absorption solution at the beginning of each heating cycle of operation.

The invention together with its objects and advantages is set forth in more technical detail in the following description and accompanying drawing, wherein:

Fig. 2 is a transverse sectional view of a control valve in the cooling water supply line showing the valve angles for the more important positions of the valve plug;

Fig. 3 is a transverse sectional view of the control valve in position to supply cooling water only to the condenser;

Fig. 4 is a view similar to Fig. 3 showing the position of the valve when the supply of cooling water is divided between the condenser and absorber;

Fig. 5 is a view similar to Fig. 3 showing the position of the valve when the cooling water is supplied first to the absorber and then to the condenser.

Figure 1:
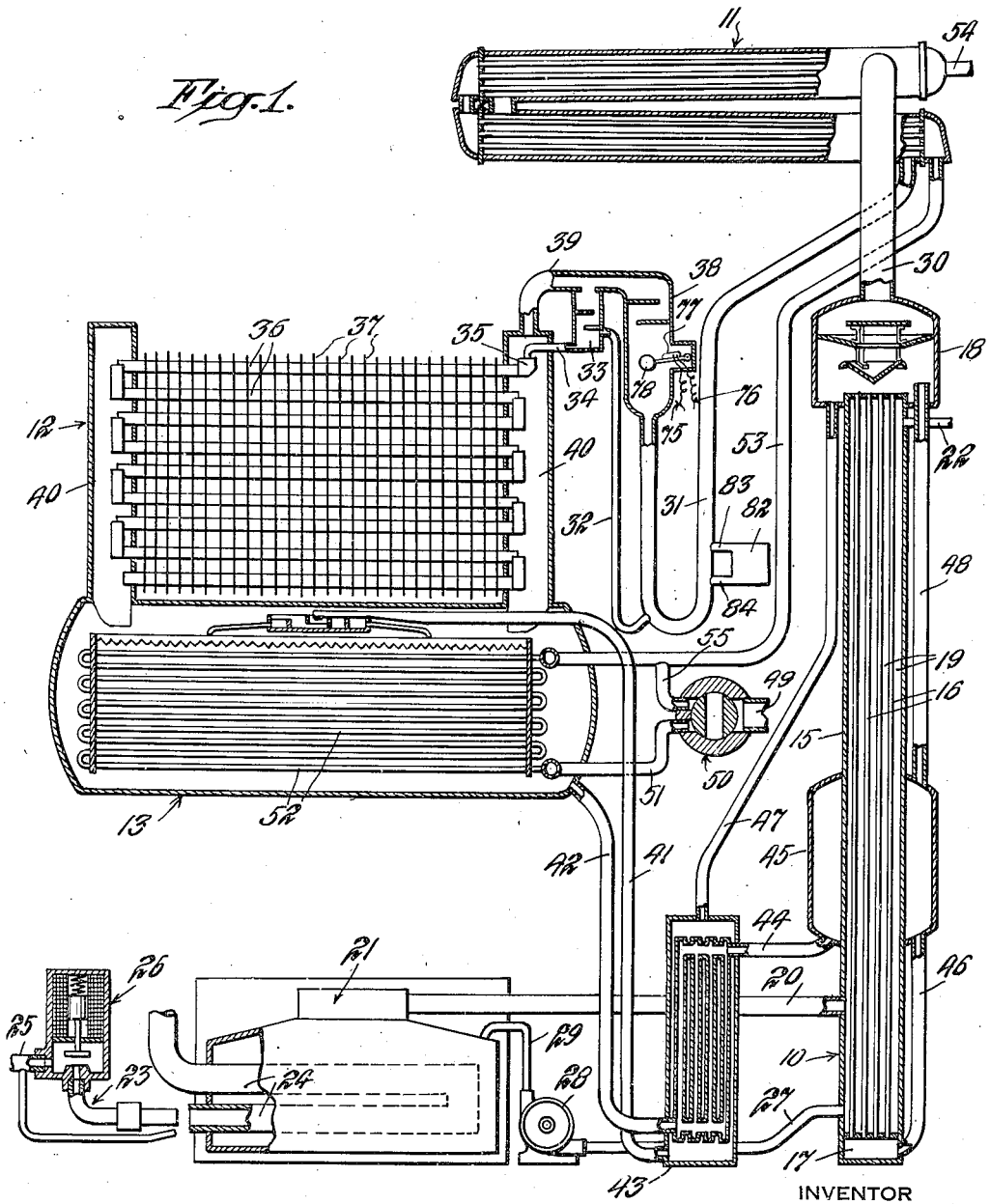
Fig. 1 is a view diagrammatically illustrating a heating and cooling system embodying the invention.

Fig. 6 is a view diagrammatically illustrating electric control circuits for energizing an electric motor which operates the cooling water supply valve; and Figs. 7, 8 and 9 are transverse sectional views taken substantially on lines 7—7, 8—8 and 9—9, respectively, of Fig. 6, showing three switches which control the energization of the electric motor.

Referring to Fig. 1 of the drawing, the apparatus shown comprises basically a two-pressure water absorption type refrigerating unit generally as described in United States Patent to A. R. Thomas and P. P. Anderson, Jr. No. 2,282,503, granted May 12, 1942. An apparatus of this type operates below atmospheric pressure and includes a generator 10, a condenser 11, an evaporator 12 and an absorber 13, which are interconnected in such a manner that, when operating as a cooling unit, flow of fluids between the high and low sides of the apparatus is regulated by liquid columns. By "condenser" as applied to the element 11 is meant the refrigerant condenser or liquefier for cooling operations. By "evaporator" as applied to element 12 is meant the heat exchanger or air contact coil which functions as an evaporator or cooling element during cooling periods of operation, and as a condenser or heat radiator during heating periods of operation.

The generator 10 includes an outer shell 15 within which are disposed a plurality of vertical riser tubes 16 having the lower ends thereof communicating with an inlet chamber 17 and the upper ends thereof projecting into and above the bottom of a separating vessel 18. A space 19 within shell 15 and about the tubes 16 forms a steam chamber to which steam is supplied through a conduit 20 from any suitable source as a boiler 21. The space 19 provides for full length heating of tubes 16, a vent conduit 22 being provided at the upper end of shell 15. The steam boiler 21 is arranged to be heated by a gas burner 23 with the flame of such burner passing into heating tubes 24 within the boiler. A combustible gas is delivered to the burner through a conduit 25 from a suitable source of supply, the flow of gas to the burner being controlled by a solenoid-operated valve 26. The condensate formed in the steam chamber of generator 10 flows therefrom through a conduit 27 to a pump 28, by which the condensate is raised through a conduit 29 into the steam boiler. Pump 28 is operated by an electric motor, not shown. Steam is supplied to chamber 19 at suitable pressures, so that the apparatus may operate as a heating unit as well as a cooling unit.

The unit contains a water solution of refrigerant in absorbent liquid such as, for example, a water solution of lithium chloride or lithium bromide or a mixture of the two. With steam supplied through conduit 20 to space 19, heat is applied to tubes 16 whereby water vapor is expelled from solution. The residue absorption solution is raised by gas or vapor-lift action with the expelled water vapor forming a small core within an upwardly rising annulus of the solution. The expelled water vapor rises more rapidly than the solution with the solution flowing along the inside walls of the tubes 16.

The water vapor flows upwardly through the tubes or risers 16 into vessel 18 which serves as a vapor separator. Due to baffling in vessel 18, water vapor is separated from raised absorption solution and flows through a conduit 30 into condenser 11 wherein the vapor is liquefied. The liquid refrigerant formed in condenser 11 flows into a U-tube or trap 31. As shown, a conduit 32 is connected between the lower portion of trap 31 and a flash chamber 33 for flow of liquid refrigerant from the former to the latter. From the flash chamber, the liquid refrigerant flows through a conduit 34 into a distributing trough 35 and from there into the upper row of tubes 36 of the evaporator or heat exchanger 12. The liquid refrigerant flows through the several rows of tubes 36 in series wherein it is vaporized with consequent absorption of heat to produce the desired refrigerating effect which is utilized, in this instance, to cool an air stream flowing over the tubes 36. Tubes 36 are provided with heat transfer fins 37. The upleg of trap 31 is connected by a separating vessel 38 and a vapor conduit 39 to the top of an evaporator header 40. As shown, the upper part of flash chamber 33 is in open communication with vapor conduit 39.

The refrigerant vapor formed in the evaporator tubes flows into headers 40 at each end of the evaporator, and from there the vapor flows to the absorber 13, in which the vapor is absorbed by the absorption solution which enters the upper part of the absorber through a conduit 41. The absorption solution enriched in refrigerant is conducted from the absorber through a conduit 42, an inner passage in a liquid heat exchanger 43, a conduit 44, a stabilizing vessel 45, and a conduit 46 into chamber 17 of generator 10. Refrigerant vapor is expelled out of solution in generator 10 by heating, and the solution is raised by gas or vapor-lift action in riser tubes 16, as explained above.

The absorption solution weak in refrigerant which has been lifted in the riser tubes into vessel 18 flows therefrom through a conduit 47, an outer passage in liquid heat exchanger 43, and conduit 41 into the upper part of absorber 13. This circulation of absorption solution results from the raising of solution in riser tubes 16, whereby such solution can flow to the absorber and return from the latter to the generator by force of gravity. The upper part of vessel 45 and the lower part of vessel 18 are connected by a vent conduit 48.

When the apparatus is operating as a cooling unit, the absorber 13 and condenser 11 constitute heat rejecting parts of the refrigeration apparatus and are cooled by a suitable cooling medium such as water, for example, which is conducted from a suitable source of supply through a conduit 49, a control valve 50 and a conduit 51 to a bank of tubes 52 within the absorber, whereby heat of absorption is given up to the cooling water. During normal cooling cycles of operation the cooling water is conducted from the absorber through a conduit 53 to condenser 11 in which heat of condensation is given up to the cooling water. The cooling water leaves the condenser through a conduit 54.

In accordance with this invention, valve 50 controls the supply of cooling water to the absorber and condenser in such a way that trap 31 is sealed against vapor flow by liquid refrigerant from the condenser 11 during cooling periods of operation, and the trap is blown free of liquid refrigerant by uncondensed vapor from the condenser during heating periods of operation. Filling of trap 31 with liquid refrigerant is expedited by delaying the cooling of the absorber behind that of the condenser at the start of a cooling cycle. This is accomplished by by-passing the cooling water around the absorber at the start of such cycle. Valve 50, which is rotated by an electric motor to be described in more detail hereinafter, may be said to have four functional positions. Position 1, as shown in Figs. 1 and 2, is the position of this valve when the unit is shut down, is on an off period between cooling cycles, or is on a heating cycle, and in which position the supply of cooling water is cut off from both the absorber and condenser. Position 2, as shown in Fig. 3, is the position of this valve at the beginning of a cooling cycle, and in which position the absorber is by-passed and all of the cooling water flows directly to the condenser 11. Position 3, as shown in Fig. 4, is an intermediate position whereby part of the cooling water flows first to the absorber and then to the condenser, and part flows directly to the condenser. Position 4, as shown in Fig. 5, is the position of the valve during normal cooling cycles of operation, whereby all of the cooling water flows first to the absorber and then to the condenser in series.

Referring to Figs. 2, 3, 4 and 5, valve 50 is illustrated as a two-way stopcock having a valve body 56 and a rotatable valve plug 57. The valve body is provided with an inlet port 58 and outlet ports 59 and 60. The inlet port is adapted to receive inlet conduit 49 and outlet ports 59 and 60, which will be referred to hereinafter as condenser port and absorber port, respectively, are adapted to receive conduits 55 and 51 which lead to the condenser 11 and the absorber 13, respectively. Valve plug 57 is provided with a single port 61 which extends transversely therethrough and which may be matched up or sealed off from the different body ports by rotating the plug to proper positions. For purposes of illustration, and as shown in Fig. 2, the angular widths of the valve ports, measured at the circumference of the valve plug, are chosen as follows: Inlet port 90°; plug port 50°; condenser port 40°; and absorber port 40°.

Referring to Fig. 6, an electric motor 62, connected by reducing gears 63 to valve plug 57, is arranged to rotate the valve plug. Three valve switches 64, 65 and 66 mounted on a shaft 57', which shaft is an axial extension of valve plug 57, control the energization of the electric motor 62. Switch 64 includes a rotatable conductor 64ª, provided with two large diameter portions 64ᵇ separated by two small diameter portions 64ᶜ, and two stationary conductors 64ᵈ, which stationary conductors are spaced 180° apart and are made of spring bronze or similar material. With this arrangement the stationary conductors are held in contact with the rotatable conductor by their own spring pressure as long as the rotatable conductor is turned to a position which brings the contact points of the stationary conductors opposite the large diameter portions of the rotatable conductor. The large diameter portions 64ᵇ of rotatable conductor 64ª each measure approximately 170° on the circumference of this conductor, while the small diameter portions each measure approximately 10°. Valve switches 65 and 66 are substantially the same as valve switch 64, except that the large and small diameter portions of switches 65 and 66 have angle measurements differing from each other and from those of valve switch 64. The angular measurement of each of the large diameter portions 65ᵇ of rotatable contact 65ª is approximately 70° and the angular measurement of the small diameter portions 65ᶜ are each approximately 110°. The angular measurement of the large diameter portions 66ᵇ of rotatable conductor 66ª are each approximately 120° and the small diameter portions 66ᶜ of this conductor are each approximately 60°. The primed reference characters applied to switches 65 and 66 in Figs. 6, 8 and 9 designate parts similar to those of switch 64 in Figs. 6 and 7. As shown in Figs. 7 to 9 the rotatable conductors are insulated from the shaft 57' upon which they are mounted by insulating members 80, and the stationary conductors are mounted upon an insulating housing 81.

Valve plug 57 and valve switches 64, 65 and 66 are rotated by the motor 62 in one direction only, as indicated by the arrows in Figs. 2, 7, 8 and 9. Each is symmetrical about a diameter, and therefore each passes through identical complete sequences of positions and returns to the starting position each time shaft 57' is rotated through 180°. The 0–180° scale superimposed upon valve 50 in Fig. 2 shows the angles through which the plug 57 must be rotated, starting from the closed position shown, to bring the leading edge of plug port 61 to the indicated positions on the valve body 56. Angles on this scale will be hereinafter referred to as valve angles. The positions of the rotatable contacts 64ª, 65ª, and 66ª shown in Figs. 7, 8 and 9, respectively, are the positions which correspond to that of valve plug 57 in Figs. 1 and 2. The following schedule shows the relative timing of valve plug 57 and of valve switches 64, 65 and 66 for the more important valve angles. The headings show the settings of a selector switch 72 which bring the various valve switches into and out of the motor circuit, as will be explained later.

*Timing schedule of cooling water control valve 50*

| Position of Selector Switch 72 | | 70–70' | 71–70' Direct | 71–71' Via level switch 77 |
|---|---|---|---|---|
| Valve Switch | | 64 | 65 | 66 |
| Valve Angle | Valve Position | | | |
| 0 or 180 | Closed | Open | Closed | Closed. |
| 10 | do | Closes | do | Do. |
| 20 | Condenser port 59 starts to open | Closed | do | Do. |
| 60 | Condenser port 59 reaches full open | do | do | Do. |
| 70 | Condenser port 59 starts to close; Absorber port 60 starts to open. | do | Opens | Do. |
| 110 | Condenser port 59 reaches full closed; Absorber port 61 reaches full open. | do | Open | Do. |
| 120 | Absorber port 61 starts to close | do | do | Opens. |
| 160 | Absorber port 61 reaches full closed | do | Closes | Closes. |
| 180 or 0 | Closed | Opens | Closed | Closed. |

Referring to Fig. 6, one side of an electric supply line is permanently connected by a conductor 67 to one terminal of electric motor 62, and the other side of the electric supply line is permanently connected by conductors 68 and 69 to terminals 70 and 71, respectively, of the selector switch 72. The motor is energized whenever the circuit to the other motor terminal is completed through the selector switch 72 and any of the valve switches 64, 65 and 66. As shown, switches 64, 65 and 66 are permanently connected to the other motor terminal by conductors 64ᵉ, 65ᵉ and 66ᵉ, which are connected to a common conductor 67' that leads to the other motor terminal. Switch 72 is a single-pole two-position snap-action selector switch which is interlocked with the main control, not shown, of the heating and cooling system. The main control may be of the type illustrated and described in United States patent to Sven W. E. Andersson No. 2,381,427, granted August 7, 1945. The disclosure of this Andersson patent may be considered as being incorporated in this application, and, if desired, reference may be had thereto for a detailed description of the main control.

For this purpose of this application it is sufficient to say that the main control includes manually operated electric switches for initiating heating and cooling cycles of operation. The main control also includes a thermostatic switch, operable responsive to the temperature of the room or enclosure that is being heated or cooled, for controlling the supply of steam to the generator 10 of the heating and cooling system. The thermostatic switch may, for instance, control the operation of the solenoid-operated valve 26 which supplies fuel gas to the steam boiler 21, which boiler in turn supplies steam to generator 10. An interlocking mechanism, not shown, sets switch 72 to make contact between switch terminals 71 and 71' whenever the main control is set for cooling and gas is supplied to the burner 23 in response to the room thermostat. Whenever either or both of these conditions ceases to exist, the interlocking mechanism sets switch 72 in the full line position shown in Fig. 6, whereby contact is made between switch terminals 70 and 70'. It is therefore seen that either terminal 70' or 71' is energized at all times. Terminal 70' is permanently connected to valve switch 64 by a conductor 73, and terminal 71' is permanently connected to valve switch 65 by a conductor 74. Terminal 71' is also connected by conductors 75 and 76 to valve switch 66 whenever level switch 77, to be referred to in more detail hereinafter, is closed.

Referring now to Fig. 1, as well as to Figs. 3 to 6 inclusive, level switch 77 is illustrated as a mercury switch mounted on a float 78, which float is pivotally mounted in separating vessel 38 of trap 31. The arrangement is such that switch 77 is closed when the level of liquid refrigerant in vessel 38 of trap 31 rises above a predetermined height, and this switch remains open at all other times. This predetermined height of liquid in vessel 38 must be sufficient to insure that the contents of trap 31 will not be blown over into the evaporator header when the cooling water is turned to the absorber by rotating valve plug 57 of valve 56 from position shown in Fig. 3 to that shown in Fig. 5, that is, from the 70° to the 110° position, as indicated in the timing schedule.

In the operation of cooling water valve 50, assume that the system is standing idle or that the main control is turned to heating. Valve 50 will be in a position shown in Figs. 1 and 2, that is, in the closed position, and the valve will remain closed regardless of on and off cycling of the system during heating cycles of operation. On heating cycles of operation the cooling water is shut off from both the condenser and the absorber. Assume now that the main control is shifted to cooling and that the room thermostat calls for cooling, selector switch 72 will be shifted by the interlocking mechanism to the dotted line position shown in Fig. 6, valve switch 65 is already in closed position, as shown in Fig. 8, so that the electric motor is energized. The electric motor will then run until the 70° valve position, that is, the position shown in Fig. 3, is reached and valve switch 65 opens. At this point the cooling water is on full directly to the condenser. The motor will continue to run if trap 31 is full of liquid refrigerant and level switch 77 is therefore closed, until the 120° valve position, that is, the position shown in Fig. 5, is reached, at which time the cooling water is on full through the normal path for cooling cycles of operation, first through the absorber and then through the condenser in series.

However, if trap 31 is not filled with liquid refrigerant when the 70° valve position is reached, the opening of valve switch 65 stops the motor until such time as condensate from the condenser fills trap 31 to a height sufficient to raise the float 78 and close level switch 77, whereupon the motor starts and runs until stopped by the opening of valve switch 66 when the 120° valve position is reached, as described above. Once the 120° position is reached, the motor and valve can not turn further until either the thermostatic switch cuts off the supply of gas to the gas burner, whereupon the supply of steam is cut off to the generator, or the main control setting is changed from cooling to one of the other positions. In the meantime, valve 50 sends the cooling water through its normal path, first through the absorber and then through the condenser. When the thermostat turns off the supply of gas to the steam boiler, or when the main control setting is changed, the selector switch 72 shifts to the full line position shown in Fig. 6, valve switch 64 is already closed, and the motor runs until cut off by the opening valve switch 64 when the 180° position is reached, thus cooling water is shut off from both the absorber and condenser. It will thus be seen that the cooling water valve is always returned to either the 0° or the 180° position when the unit shuts off following a cooling cycle.

In order to dilute the refrigerant-absorbent solution and thus permit the generator to operate at a lower temperature than would otherwise be required on heating cycles, liquid refrigerant is stored in an inactive part of the system during cooling cycles of operation, which stored refrigerant is returned to the active part of the system during heating cycles of operation. For this purpose, a reservoir 82 is attached to the down leg of trap 31. In order to provide for proper filling and draining of reservoir 82 without increasing the pressure drop on refrigerant vapor through trap 31 during heating cycles, the reservoir is connected to the trap by two small conduits 83 and 84. Reservoir 82 may be given sufficient capacity to produce any desired degree of dilution of the solution during heating cycles. However, the larger the reservoir is, the longer it will take to fill trap 31 when the unit is started up on a cooling cycle following a shutdown on a heating cycle.

In operation, when the apparatus is functioning as a cooling system, refrigerant vapor expelled from solution in the generator is condensed in the condenser and the liquid refrigerant produced thereby flows into trap 31, and from there the liquid refrigerant flows through conduit 32, flash chamber 33, conduit 34 and distributing trough 35 into the evaporator tubes wherein the liquid refrigerant is vaporized by extraction of heat from air flowing over the evaporator tubes, as explained above. During this normal cooling cycle operation the control valve for the cooling water is in the position shown in Fig. 5 in which position the cooling water flows from conduit 49, through valve 50, through conduit 51 and the bank of tubes 52 in the absorber, and from there the cooling water flows through conduit 53 to the condenser.

In order to shift from a cooling cycle to a heating cycle the main control is moved so that the electric motor which operates valve 50 rotates this valve from the position shown in Fig. 5 to that shown in Fig. 1, whereby the supply of cooling water is cut off from both the absorber and the condenser, and, with refrigerant vapor being expelled from solution in the generator and conveyed to the condenser, the pressure in the condenser is increased to the extent that trap 31 is blown free of liquid refrigerant and hot refrigerant vapor passes through this trap, through vessel 38 and conduit 39 into the upper portion of header 40 at one end of the evaporator. This hot refrigerant vapor passes through the tubes 36 of the evaporator, which now functions as a heat radiator, wherein the hot vapor is condensed, giving up its heat of condensation to air flowing over the evaporator tubes, thereby heating the air. Simultaneous with the blowing of trap 31, the stored liquid refrigerant is drained from reservoir 82 and returned to the solution circuit, thereby diluting the refrigerant-absorbent solution so that the generator now operates at a lower temperature.

To shift from a heating cycle to a cooling cycle, or to start up the apparatus on a cooling cycle, the main control is set for cooling whereupon the selector switch shifts to the broken line position shown in Fig. 6, whereby the electric motor is energized through switch 65 and the valve plug is rotated from the position shown in Figs. 1 and 2 to the position shown in Fig. 3. In this position of the valve all of the cooling water passes directly to the condenser. With the cooling water shut off from the absorber, and with hot absorption solution being conveyed from the generator to the absorber, the vapor pressure of this hot solution maintains the pressure almost as high on the low side of trap 31 as on the high side of this trap, and with the cooling water flowing directly to the condenser the refrigerant vapor is condensed therein and flows into trap 31 rapidly filling this trap and establishing a pressure balancing liquid column between the condenser and the evaporator. With the establishment of trap 31, conduit 32 is filled with liquid refrigerant to the point of over-flowing into flash chamber 33. As explained above, when liquid refrigerant rises in trap 31 to a predetermined height, float 78 rises and closes level switch 77, whereupon the motor is energized through switch 66. The motor then rotates valve plug 57 from the position shown in Fig. 3 through the position shown in Fig. 4 to the position shown in Fig. 5, thus gradually closing the cooling water by-pass to the condenser and supplying cooling water to the absorber so gradually that the inlet cooling water for the condenser never heats up enough to cause trap 31 to blow out. When the valve plug reaches the position shown in Fig. 5 it stops and the system is ready for normal operation on cooling cycles.

The ascending leg of trap 31 must be high enough, as well as protected against loss of liquid caused by flashing, to hold the maximum difference in pressure between the condenser and the evaporator during cooling cycles of operation. As shown, separating vessel 38 is provided with baffles whose function is to direct a fraction only of the liquid refrigerant pumped by the ascending leg of trap 31 into the evaporator, and to allow the rest of such liquid to fall back into the trap. In this manner pumping in the ascending leg of trap 31 is slowed down and the trap is protected against excessive loss of liquid due to flashing. The ascending leg of trap 31 should be small enough in diameter to be pumped substantially empty within a short period of time by the large amount of vapor which enters the trap, accompanied by little or no condensate, at the beginning of a heating cycle of operation. However, the conduit which forms this trap should be large enough in diameter that the liquid seal provided thereby will not be broken by flashing when the trap is fed by a large amount of liquid refrigerant, particularly at the start of a cooling cycle of operation. Furthermore, the conduit which forms trap 31 should be large enough to pass all the vapor necessary for heating without appreciable pressure drop, and, for the same reason, the entire vapor path between the condenser and the evaporator header should be streamlined as far as possible.

Having thus described my invention, I wish it to be understood that I do not desire to be limited to the exact details of construction shown and described, for obvious modifications will occur to a person skilled in the art.

What is claimed is:

1. An absorption refrigerating apparatus of the two-pressure type comprising a generator, a condenser, an evaporator, an absorber and conduits interconnecting said elements for flow of a refrigerating medium and an absorption liquid and for regulating the flow of fluid therethrough, the conduit connecting the condenser and the evaporator including a pressure balancing liquid trap, means for supplying a cooling medium only to the condenser or to said absorber and said condenser simultaneously, said means including a multi-ported valve, and control mechanism operable responsive to the presence of liquid in said liquid trap for controlling the operation of said valve.

2. An absorption refrigerating apparatus of the two-pressure type comprising a generator, a condenser, an evaporator, an absorber and conduits interconnecting said elements for flow of a refrigerating medium and an absorption liquid and for regulating flow of fluid therethrough; the conduit connecting the condenser and the evaporator including a pressure-balancing liquid column, means for supplying a cooling medium to said absorber and said condenser, said means including cooling water supply lines and valve structure for controlling the supply of cooling water through said lines in such manner that cooling water flows either directly to the condenser or it may flow directly to the absorber and from there to the condenser in series, and means responsive to the height of liquid in the liquid column for actuating the valve structure to shift the supply of cooling water from the condenser to the absorber.

3. An absorption refrigerating apparatus of the two-pressure type comprising a generator, a condenser, an evaporator, an absorber and conduits interconnecting said elements for flow of a refrigerating medium and an absorption liquid and for regulating the flow of fluid between the high and low pressure sides of the apparatus, the conduit connecting the condenser and the evaporator including a pressure-balancing liquid column, means for supplying a cooling medium directly to the condenser until the pressure-balancing trap is filled with liquid and for then shifting the supply of cooling medium for flow first through the absorber and then through the condenser in series, said means including a multi-ported valve, an electric motor for operating said valve, and control means operable responsive to the level of liquid in the liquid column for controlling the operation of said motor.

4. A heating and cooling apparatus including a heat exchanger which serves as an evaporator or cooling element on cooling cycles of operation and as a condenser or heat radiator on heating cycles of operation, an absorber, a generator, a liquefier, conduits interconnecting said elements to provide circuits for flow of a refrigerating medium and an absorption solution and for regulating flow of fluids therethrough, means for cooling said liquefier and absorber and for rendering said cooling means ineffective, a vessel connected in said system, and said vessel being constructed and arranged in the system to store liquid and return stored liquid responsive to a change in an internal condition in the apparatus to concentrate the absorption solution at the beginning of a cooling cycle and dilute the absorption solution at the beginning of a heating cycle. whereby the generator operates at a lower temperature during the heating cycles than during cooling cycles.

5. A heating and cooling apparatus including a heat exchanger which serves as an evaporator or cooling element on cooling cycles of operation and as a condenser or heat radiator on heating cycles of operation, an absorber, a generator, a liquefier, conduits interconnecting said elements to provide circuits for flow of a refrigerating medium and an absorption solution and for regulating flow of fluids therethrough. means for cooling said liquefier and absorber and for rendering said cooling means ineffective, a vessel connected in said system, and said vessel being constructed and arranged in the system to store liquid and return stored liquid responsive to a change in pressure in the apparatus to concentrate the absorption solution at the beginning of a cooling cycle and dilute the absorption solution in the beginning of a heating cycle, whereby the generator operates at a lower temperature during the heating cycles than during cooling cycles.

6. A heating and cooling apparatus including a heat exchanger which serves as an evaporator or cooling element on cooling cycles of operation and as a condenser or heat radiator on heating cycles of operation, an absorber, a generator, a liquefier. conduits interconnecting said elements to provide circuits for flow of a refrigerating medium and an absorption solution and for regulating flow of fluids therethrough, means for controlling a supply of cooling medium to said liquefier and absorber, and a vessel connected in said system to store liquid and return stored liquid for diluting the absorption solution at the beginning of a heating cycle and concentrating the absorption solution at the beginning of a cooling cycle, whereby the generator operates at a lower temperature during heating cycles than during cooling cycles, said vessel being operable to store or return liquid responsive to the supply of cooling medium to the liquefier.

7. A heating and cooling apparatus including a heat exchanger which serves as an evaporator or cooling element on cooling cycles of operation and as a condenser or heat radiator on heating cycles of operation, an absorber, a generator, a liquefier, conduits interconnecting said elements to provide circuits for flow of a refrigerating medium and an absorption liquid and for regulating flow of fluid therethrough, means for supplying a cooling medium to said liquefier and absorber, means for controlling the supply of said cooling medium, and means for storing liquid refrigerant out of its normal path of flow during cooling cycles of operation and for returning the stored refrigerant to its normal path of flow during heating cycles of operation, whereby the generator operates at lower temperatures during heating cycles than during cooling cycles, said last-named means being operable responsive to the supply of cooling medium to the liquefier.

8. A heating and cooling apparatus including a heat exchanger serving as either an evaporator for cooling or as a condenser for heating, an absorber, a generator, a liquefier, conduits interconnecting said elements to provide circuits for flow of a refrigerant fluid and an absorption liquid, said conduits including means forming a liquid trap between the liquefier and the heat exchanger for maintaining a pressure difference therebetween, and means for supplying a cooling medium to said absorber and said liquefier, said last-named means including a multi-ported valve so constructed and arranged that in one position thereof the supply of cooling medium is cut off, whereby the liquid trap between the liquefier and the heat exchanger is blown and refrigerant vapor flows from the former to the latter wherein the vapor is condensed producing a heating effect, in a second position of said valve the cooling medium is supplied only to the liquefier, whereby the liquid trap is established between the liquefier and the heat exchanger, and in a third position of said valve cooling medium is supplied first to the absorber and then to the liquefier in series, whereby liquid refrigerant flows from the liquefier to the heat exchanger wherein the liquid is vaporized producing a cooling effect.

9. A heating and cooling apparatus including a heat exchanger serving as either an evaporator for cooling or as a condenser for heating, an absorber, a generator, a liquefier, conduits interconnecting said elements to provide circuits for flow of a refrigerant fluid and an absorption liquid, said conduits including liquid traps for so regulating flow of fluid therethrough that said apparatus serves as a two-pressure absorption refrigerating system, and means for supplying a cooling medium to said absorber and liquefier, said supply means including a multi-ported valve so constructed and arranged that in one position thereof the supply of cooling medium is cut off from both the absorber and liquefier, in a second position of the valve the cooling medium is supplied only to the liquefier, in a third position of the valve the supply of cooling medium is divided between the absorber and liquefier and in a fourth position of the valve the cooling medium is supplied first to the absorber and then to the liquefier in series.

10. An absorption refrigerating apparatus of the two-pressure type comprising a generator, a condenser, an evaporator, an absorber and conduits interconnecting said elements to provide circuits for flow of a refrigerating medium and an absorption liquid and for regulating flow of fluid therethrough, the conduit connecting the condenser and evaporator including a liquid trap and a liquid reservoir in open communication with said trap, means for cooling said absorber and said condenser, said cooling means including conduits for supplying cooling water to the absorber and condenser, a multi-ported valve in said conduits, said multi-ported valve being movable to a plurality of positions in sequence, one, whereby the supply of cooling water is cut off from both the condenser and absorber, two, whereby the supply of cooling water flows only to the condenser, three, whereby the supply of cooling water is divided between the condenser and the absorber, and four, whereby the supply of cooling water flows first to the absorber and then to the condenser in series, and control means for moving said multi-ported valve through the different positions, said control means including an electric motor for moving said valve and means responsive to internal conditions of the apparatus for controlling the operation of said motor.

11. A heating and cooling apparatus including a heat exchanger serving as either an evaporator for cooling or as a condenser for heating, an absorber, a generator, a liquefier, conduits interconnecting said elements to provide circuits for flow of a refrigerant fluid and an absorption liquid, said conduits including liquid traps for so regulating flow of fluid therethrough that said apparatus serves as a two-pressure absorption refrigerating system, one of said traps being provided with a reservoir for the storage of liquid refrigerant during cooling cycles of operation, means for filling said one trap and said reservoir with liquid refrigerant at the beginning of a cooling cycle of operation and for draining said one trap and reservoir of liquid refrigerant at the beginning of a heating cycle of operation, said last-named means including means for supplying a cooling medium to said absorber and liquefier, and said supply means including a multi-ported valve so constructed and arranged that in one position thereof the supply of cooling medium is cut off from both the absorber and liquefier, whereby the one trap and reservoir are drained of liquid refrigerant and hot vapor flows from the liquefier to the heat exchanger, in a second position of the valve cooling medium is supplied only to the liquefier, whereby liquid refrigerant is supplied to the one trap and reservoir, in a third position of the valve the supply of cooling medium is divided between the absorber and liquefier, whereby the one trap is established and the reservoir is filled with liquid refrigerant, and in a fourth position of the valve the cooling medium is supplied first to the absorber and then to the liquefier in series, whereby the one trap is maintained, the reservoir is kept full of liquid refrigerant and liquid refrigerant flows from the liquefier to the heat exchanger.

12. A heating and cooling apparatus including a heat exchanger that serves as an evaporator or cooling element on cooling cycles and as a condenser or heat radiator on heating cycles, a generator, a liquefier, an absorber and conduits interconnecting said elements to provide circuits for flow of a refrigerating medium and an absorption liquid, the conduit connecting the liquefier and heat exchanger including a liquid trap for balancing the pressure between said two elements during cooling cycles of operation, control means for shifting said apparatus from heating to cooling and from cooling to heating, means for cooling said liquefier and absorber during cooling cycles of operation and for rendering said cooling means ineffective during heating cycles of operation, said cooling means including a multi-ported valve for controlling the supply of cooling medium, and means dependent upon whether the apparatus is set for heating or for cooling for moving said valve to different positions whereby the supply of cooling medium is cut off, is supplied only to the liquefier, is divided between the liquefier and absorber, or is supplied first to the absorber and then to the liquefier in series, said last-named means including a control operable responsive to the level of liquid in the liquid trap for holding the valve in position to supply cooling medium only to the liquefier until the liquid trap is filled and for then moving the valve to the position whereby the cooling medium is supplied first to the absorber and then to the condenser.

13. The method of establishing a pressure-balancing liquid column between the high and low pressure sides of an absorption refrigerating system of the two-pressure type which comprises flowing refrigerant vapor from a place of vapor expulsion to a place of liquefaction while simultaneously flowing hot absorption solution to a place of absorption, flowing cooling water directly to the place of liquefaction whereby the refrigerant vapor delivered thereto is liquefied, flowing the liquid refrigerant to a place of accumulation thereby gradually building up a liquid column, continuing the flow of cooling water directly to the place of liquefaction until the liquid column is established, and shifting the flow of cooling water from the place of liquefaction directly to the place of absorption responsive to the establishment of the liquid column.

14. In the art of heating and cooling air by the aid of an absorption refrigerating system of the two-pressure type, that improvement which comprises expelling refrigerant vapor from a refrigerant-absorbent solution in a place of vapor expulsion, flowing the expelled vapor as such through a place of liquefaction to a place of heat exchange wherein the vapor is condensed giving up its heat of condensation to air flowing over the place of heat exchange thereby heating the air, flowing a supply of cooling medium in heat exchange relation with the place of liquefaction, whereby refrigerant vapor delivered thereto is liquefied, establishing a vapor barrier of the liquefied refrigerant between the place of liquefaction and the place of heat exchange, dividing the supply of cooling medium between the place of liquefaction and a place of absorption while continuing to supply liquid refrigerant to the vapor barrier, flowing liquid refrigerant from the place of liquefaction to the place of heat exchange, flowing the supply of cooling medium to the place of absorption and from there to the place of liquefaction, whereby the vapor pressure is reduced in the place of absorption and in the place of heat exchange and the liquid refrigerant delivered to the place of heat exchange is vaporized therein by extracting heat from air flowing thereover.

15. In the art of cooling by the aid of an absorption refrigerating system of the two-pressure type, that improvement which comprises expelling refrigerant vapor from a refrigerant-absorbent solution in a place of vapor expulsion, flowing the expelled vapor to a place of liquefaction while flowing a cooling medium directly to the place of liquefaction whereby the expelled vapor is liquefied, simultaneously flowing hot absorption liquid to a place of absorption, whereby the pressure in the low pressure side of the system is substantially as high as that in the high pressure side thereof, flowing liquid refrigerant from the place of liquefaction to a place of accumulation between the place of liquefaction and a place of heat exchange thereby gradually establishing a pressure-balancing liquid column between the high and low pressure sides of the system, continuing the flow of cooling medium directly to the place of liquefaction until the liquid column is established, shifting the flow of cooling medium from the place of liquefaction to the place of absorption responsive to the amount of liquid accumulated in the place of accumulation, whereby the pressure in the place of absorption is reduced, flowing liquid refrigerant from the place of liquefaction through the place of accumulation to the place of heat exchange, and vaporizing the liquid refrigerant in the place of exchange thereby producing a refrigerating effect.

16. In the art of heating and cooling air by the aid of an absorption refrigerating system of the two-pressure type, that improvement which comprises expelling refrigerant vapor from a refrigerant-absorbent solution in a place of vapor expulsion, flowing the expelled vapor to a place of liquefaction, flowing a cooling medium in heat exchange relation with the place of liquefaction, whereby the expelled vapor is liquefied, establishing a vapor barrier between the place of liquefaction and a place of heat exchange, flowing liquid refrigerant from the place of liquefaction out of its normal path of flow to a place of storage, flowing liquid refrigerant from the place of liquefaction to the place of heat exchange wherein the liquid is vaporized by the extraction of heat from air flowing over the place of heat exchange, and discontinuing the flow of cooling medium in heat exchange relation with the place of liquefaction while continuing the flow of refrigerant vapor thereto, whereby the pressure therein is raised to the extent that the vapor barrier is removed from between the place of liquefaction and the place of heat exchange, the stored refrigerant is returned to the refrigerant-absorbent solution and refrigerant vapor flows substantially unrestricted from the place of liquefaction to the place of heat exchange wherein the vapor is condensed giving up its heat of condensation to air flowing thereover.

17. In the art of heating and cooling air by the aid of an absorption refrigerating system of the two-pressure type, that improvement which comprises expelling refrigerant vapor from a refrigerant-absorbent solution in a place of vapor expulsion, flowing the expelled vapor to a place of liquefaction, flowing a cooling medium in heat exchange relation with the place of liquefaction, whereby the expelled vapor is liquefied, establishing a vapor barrier between the place of liquefaction and a place of heat exchange while simultaneously storing liquid refrigerant out of its normal path of flow, flowing liquid refrigerant from the place of liquefaction to the place of heat exchange wherein the liquid is vaporized by the extraction of heat from air flowing over the place of heat exchange, and discontinuing the flow of cooling medium in heat exchange relation with the place of liquefaction while continuing the flow of refrigerant vapor thereto, whereby the pressure therein is raised to the extent that the vapor barrier is removed from between the place of liquefaction and the place of heat exchange, the stored refrigerant is simultaneously returned to the refrigerant-absorbent solution and refrigerant vapor flows substantially unrestricted from the place of liquefaction to the place of heat exchange wherein the vapor is condensed giving up its heat of condensation to air flowing thereover.

18. A heating and cooling apparatus including a heat exchanger which serves as an evaporator or cooling element on cooling cycles of operation and as a condenser or heat radiator on heating cycles of operation, a generator, a liquefier, an absorber, conduits interconnecting the elements for flow of a refrigerating medium and an absorption liquid and for regulating the flow of fluid between the high and low pressure sides of the apparatus, the conduit connecting the liquefier and heat exchanger providing an unrestricted path for the flow of vapor during heating cycles and arranged to provide a pressure balancing liquid trap during cooling cycles, means for supplying cooling medium for the liquefier and absorber during cooling cycles, and a regulating device for delivering cooling medium only to the liquefier until a pressure balancing liquid column is formed and then delivering cooling medium to both the liquefier and absorber.

RALPH M. BUFFINGTON.

REFERENCES CITED

The following references are of record in the file of this patent:

UNITED STATES PATENTS

| Number | Name | Date |
| --- | --- | --- |
| 2,019,290 | Brace | Oct. 29, 1935 |
| 2,064,040 | Smith | Dec. 15, 1936 |
| 2,365,797 | Bichowsky | Dec. 26, 1944 |